United States Patent Office 3,199,590
Patented Aug. 10, 1965

3,199,590
METHOD OF CONSOLIDATING INCOMPETENT
SANDS AND COMPOSITION THEREFOR
Bill M. Young, Duncan, Okla., assignor to Halliburton
Company, Duncan, Okla., a corporation of Delaware
No Drawing. Filed Feb. 25, 1963, Ser. No. 260,831
19 Claims. (Cl. 166—33)

This application is a continuation-in-part of application Serial No. 177,188, filed March 5, 1962.

The present invention relates to a new and improved method of consolidating incompetent or loose sands and composition therefor, and more particularly to a new and improved sand control process or resin system for consolidating calcareous and non-calcareous sands utilizing an acid curable resinous formulation and retaining a permeable formation.

The present invention especially relates to a new and improved sand consolidation method wherein an in situ curing of a resinous fluid is provided.

Various sand consolidation methods and techniques have been employed to prevent or inhibit sand movement with crude oil production. Some of the methods heretofore employed are: gravel packing, use of various filter materials, the use of mechanical filters and screens, cementing with preservation of interstices, packing the formation with resin coated ground walnut hulls, wetting the unconsolidated sand with a bonding resin, and placing a resin treated sand between the loose sand in the formation and the well bore so as to form a screen. These methods have met with varying degrees of success.

It is an important object of the present invention to provide a new and improved permeable and consolidated barrier adjacent to a well bore so as to facilitate fluid production essentially free of solids.

Another important object of the present invention is to provide a new and improved resinous system for consolidating loose sands wherein an in situ curing of the consolidating fluid or resin is provided, which system is essentially immiscible with consolidating fluids. Such a characteristic minimizes the chances of removing so much bonding material from the pore spaces that satisfactory consolidation of the loose sands is not accomplished.

It is a particular object of the present invention to provide a new and improved catalyst-oil overflush solution, wherein a halogenated low molecular weight organic acid is dissolved or dispersed in the oil.

Another important object of the present invention is to provide a new and improved resin, resin system or consolidating fluid mixture which is especially suited for curing or catalyzation with an oil soluble halogenated low molecular weight organic acid or acid forming chemical.

Other objects and advantages of the present invention will become more readily apparent from a consideration of the description hereinbelow.

The present invention basically consists of first pumping an acid curable consolidating fluid into the unconsolidated sand or earth formation and secondly pumping an oil overflush solution containing a low molecular weight organic acid or a delayed acid producing chemical dispersed or dissolved therein. A small quantity of diesel oil spacer may be used between the plastic and catalyst solution if desired. The overflush functions to remove the excess bonding material from the existing pore spaces to provide the necessary permeability, and its acid producing component promotes subsequent hardening of the remaining film of consolidating fluid which covers the sand or earth particles, thereby consolidating or stabilizing the loose formation.

In the preferred form of the invention, the curing or hardening agent is dissolved in an overflush vehicle or solution which possesses a relatively high degree of immiscibility with the bonding material. Such a favorable characteristic considerably lessens the possibility of removing too much of the consolidating fluid away from the sand or earth particles.

The sand consolidation method and composition of the present invention is particularly adapted for consolidating calcareous and non-calcareous loose or incompetent sands found in an oil or gas well whereby a strong, stable and permeable consolidation is obtained. It provides a much needed improvement for solving migratory sand problems in oil and gas wells.

The sand consolidation method and composition has a number of advantages over prior art methods and compositions, among which are:

(1) It is faster reacting and produces higher film strengths.

(2) The acid-oil overflush facilitates curing of the consolidating fluid while also functioning as an immiscible overflush vehicle for assisting in removing excess plastic or resin from the voids and enhancing the spread of such resin or plastic throughout the formation to be treated.

(3) The resin formulation, as coated on sand surfaces, rapidly extracts trichloroacetic acid (a preferred catalyst) from highly mobile oil overflush solutions, thereby promoting rapid curing of the resin by expeditiously satisfying the catalyst requirements of the resin or plastic.

(4) The resin formulation enters the formation easily with uniformity and depth penetration.

(5) The resin formulation enables a better wetting of the sand, which results in a stronger and more stable consolidation.

(6) The resin formulation has a superior affinity for sand grain surfaces resulting in a strong resisting of wash-off by overflush solutions and enables the use of sufficient volumes or quantities of catalyst-oil overflush solution to insure contacting of the catalyst or curing agent with all of the resin or consolidating fluid.

(7) It provides an in situ sand consolidation process which is unlikely to plug a formation, even if the catalyst-oil solution is pumped or introduced directly behind the placed resin or plastic.

(8) It renders bentonitic clays insensitive to fresh water hydration and in some instances permanently shrinks such clays.

(9) One basic formula is applicable for all temperatures normally encountered in sand consolidation processes.

(10) It is particularly applicable for use in formations where environmental temperatures range from 60° F. to 300° F.

(11) The chemicals used do not require refrigeration during either storage or handling.

(12) The set or cured resin is equally or better chemically resistant to acids, brines, water, oils and strong alkalies than any other known resins suitable for sand consolidation.

(13) The cured resin or consolidation can be acidized with mud clean-out agents without injurious results to stabilized matrix.

(14) The consolidating fluid is of low viscosity and enables tight or dirty sands to be more effectively treated.

(15) Well shut-in time is considerably lessened, with four hours actually providing a good safety margin, and 12–18 hours providing an extra safe margin.

(16) Permeability retention is superior.

(17) Large grained sands such as fracturing propping agents can be consolidated.

Basically, the preferred form of the process or method of the present invention comprises treating a formation with four separate fluids of very low viscosities as follows:

(1) A surfactant-oil preflush for cleaning perforations, removing water blocks, and promoting preferentially water wet surface properties to the formation of sands;

(2) Consolidating fluid or resin formulation;

(3) Diesel oil spacer for distributing plastic to maximum coverage; and, (4) Oil-catalyst solution for further overflushing and curing of the consolidating fluid.

The consolidating fluid of the present invention comprises either or both furfuryl alchol resin and furfuryl alcohol alone, or in combination with a silane, a surfactant and water, except that if water is used in the fluid, some furfuryl alcohol must be included.

Furfuryl alcohol is a solvent for both the furfuryl alcohol resin and the water, and the amount of water which can be tolerated will be dependent upon the amount of furfuryl alcohol in the fluid or system.

It is recommended that the amount of water used not exceed the water tolerance of the system.

The range of constituents of the consolidating fluid when based on 100 parts of furfuryl alcohol resin is generally as follows:

| Constituent | Range of Constituents (parts by weight) | |
|---|---|---|
| | General Range | Preferred Range |
| Furfuryl alcohol resin | 100 | 100 |
| Furfuryl alcohol | 0–1,000 | 100–250 |
| Silane | 0–50 | 0.1–10 |
| Water [1] | 0–150 | 5–15 |
| Surfactant | 0–100 | 0.5–10 |

[1] As stated above, furfuryl alcohol must also be present when the system includes water.

The term silane or organosilicon compounds is used to identify such products or compounds as disclosed in co-pending application Serial No. 260,826, filed even date herewith, and is sometimes used to refer specifically to the compound gamma aminopropyltriethoxysilane.

Silanes or organosilicon compounds found to be particularly useful in obtaining strong sets or high compressive strength consolidations are those having the formulas:

(1)

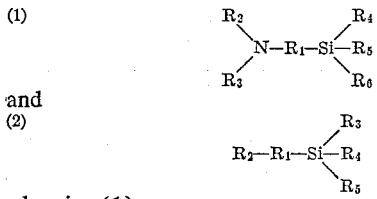

and (2)

$$R_2-R_1-Si\begin{matrix}R_3\\R_4\\R_5\end{matrix}$$

wherein: (1)

$R_1$ = an alkyl group having from 3 to 10 carbon atoms with at 3 carbon atoms being in a straight chain between the silicon and nitrogen atoms, $R_2$ and $R_3$ = hydrogen, $R_7$, or $R_7X$, where $R_7$ is an alkyl group having from 1 to 5 carbon atoms, X is either an $NH_2$ or OH group but both $R_2$ and $R_3$ cannot be $R_7$ alone in same compound, $R_4$ and $R_5$ = $R_3$ or $OR_8$ where $R_8$ is an alkyl group having from 1 to 5 carbon atoms, $R_6$ = $OR_8$;

and, (2)

$R_1$ = an alkyl group having from 2 to 5 carbon atoms, $R_2$ = glycidoxy group or a cyclohexyl group having from 1 to 2 substituted epoxy groups, $R_3$ and $R_4$ = $R_6$ or $OR_6$ where $R_6$ is an alkyl group having from 1 to 5 carbon atoms, $R_5$ = $OR_6$ U.S. Patent No. 2,930,809 also discloses a number of silanes or organosilicon compounds which may be used in this invention.

Some silanes which have been found to be particularly desirable are: gamma aminopropyltriethoxysilane, N-(beta-aminoethyl) - gamma-aminopropyltrimethoxysilane, delta-aminobutylmethyldiethoxysilane, N-methyl-gamma-aminoisobutyltriethoxysilane, N - methyl-gamma-aminopropyltriethoxysilane, delta - aminobutyltriethoxysilane, N - (beta - aminoethyl) - gamma-aminopropyltriethoxysilane, gamma dialkylaminopropyltriethoxysilane, glydicoxypropyl-trimethoxysilane, and 3,4 epoxycyclohexylethyltrimethoxysilane.

U.S. Patent No. 2,832,754 describes the synthesis of alkoxysilylpropylamines and aminopropylpolysiloxanes suitable in the instant invention.

The surfactant used in the above consolidating fluid and in the overflushes is preferably Hyflo, a well-known commercial surfactant. Hyflo is a trademark of the Halliburton Company used to identify an oil soluble surface active agent as described in U.S. Patent No. 2,946,747. Any other suitable surfactant or surface acting agent may be used without departing from the scope of the present invention.

Satisfactory sand consolidations have been obtained using formulas comprising 0–100% furfuryl alcohol resin, and 0–100% furfuryl alcohol. One or both of these materials must be present in some magnitude in order to effect a consolidation. The other constituents, water, silane and surfactant, even when used in large quantities also produced satisfactory sand consolidations.

A number of laboratory tests were made using various amounts of the different constituents of the consolidating fluid and the results of such tests are set forth hereinbelow as Example I.

EXAMPLE I

*Procedure.*—A section of glass tubing, 1 in. I.D. x 7 in. in length, containing a 15/16 in. I.D. Buna N rubber insert, was mounted on a ring stand. A perforated rubber stopper was inserted in the lower end of the tubing. A small section of copper wire screen was positioned over the perforations, and over this screen was placed a thin section of glass wool.

Sixty grams of Oklahoma No. 1 sand containing 12% calcium carbonate (marble chips crushed to essentially

*Table I*

| Blend No. | Consolidating Fluid | | | | | Compressive Strength (p.s.i.) |
|---|---|---|---|---|---|---|
| | Furfuryl Alcohol Resin [1] | Silane [2] | Furfuryl Alcohol | Water | Surfactant [3] | |
| 1 | 100 | 0 | 0 | 0 | 0 | 1,125 |
| 2 | 0 | 0 | 100 | 0 | 0 | 42 |
| 3 | 98.59 | 1.41 | 0 | 0 | 0 | 3,068 |
| 4 | 0 | 1.41 | 98.59 | 0 | 0 | 72 |
| 5 | 33.625 | 0.394 | 62.80 | 2.77 | 0.397 | 1,645 |
| 6 | 33.75 | 0.393 | 63.05 | 2.79 | 0 | 1,047 |
| 7 | 29.37 | 0.347 | 54.85 | 15.08 | 0.347 | 266 |
| 8 | 18.02 | 46.6 | 33.65 | 1.48 | 0.211 | 74.3 |
| 9 | 26.4 | 0.31 | 49.3 | 31.2 | 21.81 | 754 |
| 10 | 33.75 | 0 | 63.05 | 2.79 | 0.399 | 489 |
| 11 | 34.59 | 0.407 | 64.59 | 0 | 0.408 | 1,072 |

[1] Durez 21687 furfuryl alcohol resin.
[2] Gamma aminopropyltriethoxysilane.
[3] Hyflo.

the same particle size as the sand), by weight, was packed in the tubing to a height of 2.5 in. The sand was then flushed with 30 cc. of a standard brine solution (240:18.1:34.1:1 parts by weight, of $H_2O$, NaCl, $CaCl_2$ and $MgCl_2.6H_2O$, respectively; 30 cc. of diesel oil; 15 cc. of consolidating fluid; 250 cc. of diesel oil; and 250 cc. of catalyst-diesel oil solution (82:2 parts by weight, of diesel oil and trichloroacetic acid, respectively). All fluids were heated to 140° F. prior to squeezing through the sand. Fluid injection pressure was 4–6 p.s.i. Compressive strength measurements were made on the cores after 24 hours at 140° F.

It should be noted that although consolidations can be obtained using furfuryl alcohol alone or with furfuryl alcohol resin alone, such consolidations are not as strong or of as great extension as consolidations made using both furfuryl alcohol resin and furfuryl alcohol, and the other constituents of the preferred composition of the consolidating fluid.

EXAMPLE II

A number of laboratory tests were made using a consolidating fluid of the following formula:

| | Parts by weight |
|---|---|
| Durez 21687 furfuryl alcohol resin | 121 |
| Furfuryl alcohol | 226 |
| Gamma aminopropyltriethoxysilane | 1.42 |
| Water | 10 |
| Hyflo | none or 1.43 |

A preflush solution of either all diesel oil or 100:0.5 parts by weight, of diesel oil and Hyflo was also used in the performance of these laboratory tests.

An overflush solution of from 82:0.2 to 82:3 parts by weight, of diesel oil and trichloroacetic acid was used for curing the consolidating fluid.

GENERAL PROCEDURES USED FOR EFFECTING LABORATORY SAND CONSOLIDATIONS FOR EVALUATION

A short section of Lucite tubing 1 in. I.D. x 7 in. in length with 1 in. O.D. x .7 in. I.D. Tygon insert was vertically mounted on a ring stand. A perforated rubber stopper was inserted in the lower end of the column. A small section of copper wire screen was positioned over the perforation and over this screen was placed a thin section of glass wool.

For the major portion of the tests 30 grams of Oklahoma No. 1 sand or sand-$CaCO_3$ mix (marble chips were crushed to essentially the same particle size as the Oklahoma No. 1 sand) were used in effecting each consolidation. The exterior of the Lucite was tapped until the sand had been reduced to a height of 2.5 in. Through this granular body were flushed 30 cc. synthetic brine of Example I; 30 cc. diesel oil; 15 cc. consolidating fluid; 250 cc. of diesel oil; and 500 cc. of catalyst-diesel oil solution. Each fluid was placed down only to the top height of the sand prior to addition and squeezing of the next fluid. Fluid squeeze pressure was 20 p.s.i.g.

After treatment the perforation in the rubber stopper was plugged and the entire assembly was placed in a constant temperature bath. The core at all times was covered with overflush solution. After an interval of time had Table II

| Run No.[1] | Percent $CaCO_3$ | Hyflo in Preflush | Hyflo in Consolidating Fluid | Catalyst, Grams TCA per 100 cc. diesel oil | Time, Hrs.[2] | 80° in Air Compressive Strength (p.s.i.) |
|---|---|---|---|---|---|---|
| 1 | 6 | No | No | 0.2 | 4 | 360 |
| 2 | 12 | Yes | No | 3 | 0 | 114.3 |
| 3 | 12 | Yes | No | 3 | 4 | 762 |
| 4 | 12 | Yes | Yes | 1 | 20 | 1,143 |
| 5 | 12 | Yes | Yes | 1 | 24 | 1,045 |
| 6 | 12 | Yes | Yes | 1 | 24 | 1,241 |
| 7 | 6 | Yes | No | 1 | 6 | 810 |
| 8 | 6 | Yes | No | 1 | 6 | 795 |
| 9 | 12 | No | No | 1 | 18 | 555 |
| 10 | 12 | Yes | Yes | 1 | 18 | 1,292 |
| 11 | 12 | Yes | No | 0.2 | 5 | 467 |
| 12 | 6 | No | No | 0.2 | 4 | 719 |
| 13 | 6 | No | No | 0.2 | 4 | 903 |
| 14 | 6 | Yes | No | 0.2 | 4 | 990 |
| 15 [3] | 6 | No | No | 0.2 | 4.6 | 678 |
| 16 | 12 | No | No | 0.2 | 18 | 641 |
| 17 | 12 | No | No | 3 | 18 | 488 |
| 18 | 12 | Yes | No | 3 | 5.5 | 1,047 |
| 19 | 12 | Yes | No | 0.5 | 1.5 | 543 |
| 20 | 12 | Yes | No | 0.5 | 2.75 | 955 |
| 21 | 6 | No | No | 0.2 | 1.5 | 714 |
| 22 | 6 | No | No | 0.2 | 4 | 725 |
| 23 [3] | 6 | No | No | 0.2 | 4 | 700 |
| 24 | 12 | Yes | Yes | 0.2 | 4 | 1,057 |
| 25 | 12 | Yes | Yes | 1 | 3 | 1,107 |
| 26 | 12 | Yes | Yes | 1 | 4 | 812 |
| 27 | 12 | Yes | Yes | 1 | 3 | 930 |
| 28 | 12 | Yes | No | 1 | 4 | 276 |
| 29 | 12 | Yes | Yes | 1 | 18 | 1,165 |
| 30 | 12 | Yes | No | 0.2 | 0 | 890 |
| 31 | 12 | Yes | No | 0.5 | 1.5 | 543 |
| 32 | 12 | Yes | Yes | 3 | 4 | 415 |

[1] See the following table:

| Temperature of squeeze fluids, ° F. | | Consolidation temperatures, ° F. | |
|---|---|---|---|
| 1–6 | 80 | 1–6 | 80 |
| 7–12 | 100 | 7–11 | 100 |
| 13–15 | 110 | 12 | 110 |
| 16–18 | 140 | 13–15 | 120 |
| 19–20 | 160 | 16–18 | 140 |
| 21–24 | 180 | 19–20 | 160 |
| 25–29 | 200 | 21–29 | 200 |
| 30–32 | 210 | 30–32 | 230 |

[2] Interval from end of treatment to compressive strength measurements.
[3] Permeability measured at 7+ Darcys after consolidation and 9.5–10.5 Darcys prior to treatment.

elapsed, the consolidated specimen was removed from the bath. After the sleeve and contents were removed from the Lucite housing, the consolidated specimen was pushed out of its Tygon enclosure. The core was trimmed by ¼" on both ends. This resulting segment was cut into 2—1" segments. A compressive strength measurement was made on both consolidated portions. By combining these results, an average compressive strength was obtained. Other cores were subjected to air permeability measurements. Before permeability tests were performed, the consolidations were flushed with large volumes of naphthalene and subsequently were dried at 200° F. in a vacuum oven.

A number of larger scale tests were made as described hereinbelow.

EXAMPLE III

GENERAL PROCEDURE USED FOR CARRYING OUT LARGE-SCALE EXPERIMENTS

The procedure, materials and equipment utilized for these tests were essentially the same as described in article entitled "Large-Scale Laboratory Investigation of Sand Consolidation Techniques," by Wayne F. Hower and William Brown, published in December, 1961, Journal of Petroleum Technology. Each experiment involved the treatment of approximately 3.3 cubic feet of sand, Oklahoma No. 1, through a single 0.5 in. perforation. For each test the granular mix was packed in brine solution of Example I and was allowed to stand overnight prior to subjecting it to fluid treatment. The sand as packed in the chamber was preheated to a specific temperature by placing in a large constant temperature bath before process chemicals were pumped. Each fluid injected into sand was also heated to the temperature of the sand prior to its placement through the 0.5 in. perforation.

*Table III*

|  | Test No. | | |
|---|---|---|---|
|  | 1 | 2 | 3 |
| Temp., ° F., of Fluids Injected | 180 | 80 | 140 |
| Hyflo Preflush, Gallons [1] | 5 | 5 | 5 |
| Plastic, Gallons [2] | 1 | 1 | 1 |
| Diesel Oil Spacer, Gallons | 10 | 10 | 10 |
| Catalyst Solutions, Gallons [3] | 6 | 6 | 6 |
| Injection Rate, g.p.m.: | | | |
| Hyflo Preflush | 2.5 | 1.95 | 2.3 |
| Plastic | 2.5 | 2.1 | 2.03 |
| Diesel Oil Spacer | 2.12 | 2.15 | 2.2 |
| Catalyst Solution | 1.7 | 2.05 | 1.92 |
| Average Injection Pressure, p.s.i.: | | | |
| Hyflo Preflush | 15 | 15–18 | 15–18 |
| Plastic | 15 | 15–18 | 15–18 |
| Diesel Oil Spacer | 20 | 25–35 | 25–35 |
| Catalyst Solution | 15 | 25–35 | 25–35 |
| Consolidation Temperature, ° F. | 180 | 80 | 140 |
| Consolidation Time, Hrs.[4] | 4 | 20 | 4 |
| Compressive Strength, p.s.i., of Specimens: | | | |
| 1 | 1,168 |  | 569 |
| 2 [5] | 1,768 | 1,067 | 3,160 |
| 3 | 1,257 | 905 | 1,458 |
| 4 | 1,039 | 315 | 831 |
| 5 |  | 180 | 670 |
| 6 | 820 | 543 | 688 |
| 7 | 1,448 | 776 | 1,774 |
| 8 | 1,324 |  |  |
| Permeability, Darcys, of Specimens: | | | |
| 1 | 7.57 |  | 7.29 |
| 2 [5] | 7.55 | 8.47 | 5.72 |
| 3 | 7.9 | 7.97 | 7.35 |
| 4 | 7.49 | 7.41 | 7.45+ |
| 5 | 7.41 | 8.23 | 7.35 |
| 6 | 6.93 | 7.08 | 6.6 |
| 7 | 7.7 | 6.78 | 6.1 |
| 8 | 7.17 |  |  |

[1] 100:0.5 parts by volume of diesel oil and Hyflo, respectively.
[2] Formula of Example II including Hyflo.
[3] 82:1 parts by weight of diesel oil and trichloroacetic acid, respectively.
[4] These consolidation times are defined as the interval the treated sand remained in a heated bath.
[5] Specimen adjacent perforation.

NOTE.—Specimen taken from representative areas throughout consolidated mass.

Additional laboratory tests were conducted which illustrate the effectiveness of silane and water on the bonding properties of furfuryl alcohol resin and are set forth hereinbelow.

EXAMPLE IV

*Procedure.*—Similar to that of Example I, except that all fluids were squeezed into the sand at 160° F., no carbonates were placed in the sand, each preflush contained Hyflo, and each sample of plastic or consolidating fluid contained Hyflo. Consolidation temperatures were all at 160° F. and the samples were allowed to set 4 hours prior to compressive strength measurements being taken.

Fifty pore volumes of overflush solutions, 25 of diesel oil spacer and 25 of catalyst solution, were squeezed behind the plastic.

The plastic solution or consolidating fluid constituted 121:226:1.42:10:1.43 parts by weight, of Durez 21687 furfuryl alcohol resin, furfuryl alcohol, gamma, aminopropyltriethoxysilane, water and Hyflo, except where a particular constituent was omitted as shown in Table IV.

*Table IV*

| Run No. | $H_2O$ in Plastic | Silane in Plastic | Catalyst Solution, Grams Trichloroacetic Acid Per 100 cc. Diesel | 80° F. "In Air" Compressive Strength (p.s.i.) |
|---|---|---|---|---|
| 1 | Yes | Yes | 1 | 1,645 |
| 2 | Yes | No | 1 | 489 |
| 3 | No | Yes | 1 | 1,072 |

Some additional laboratory tests which illustrate sand consolidation prepared using Hyflo in the spacer and in the catalyst solution are as follows:

EXAMPLE V

*Procedure.*—Identical to that of Example IV, except that when Hyflo was added to spacer and catalyst solutions, the spacer consisted of 82:0.48 parts by weight, of diesel oil and Hyflo, respectively, and the catalyst solution consisted of 82:1:0.48 parts by weight, of diesel oil, trichloroacetic acid and Hyflo, respectively. Plastic also contained all preferred constituents.

*Table V*

| Run No. | Hyflo in Spacer | Hyflo in Catalyst Solution | 80° F. "In Air" Compressive Strength (p.s.i.) |
|---|---|---|---|
| 1 | Yes | No | 1,091 |
| 2 | Yes | Yes | 1,401 |
| 3 | No | No | 1,645 |

As the ability to form consolidations in calcareous sands is an important feature of the present invention, some laboratory tests using sands containing varying amounts of calcium carbonate are as follows:

EXAMPLE VI

*Procedure.*—Similar to that of Example II.

*Table VI*

| $CaCO_3$ Content of Particle Mix, percent | Compressive Strength of Consolidations, p.s.i. | $CaCO_3$ Content of Consolidation, Percent |
|---|---|---|
| 0 | 1,645 | 0 |
| 12 | 825 | 9.9 |
| 25 | 808 | 21.5 |
| 50 | 497 | 45.9 |
| 100 | 308 | 89.8 |

Also, as it is important that sand consolidation be stable, some results of laboratory tests showing the stability of consolidations made with the instant invention are set forth hereinbelow.

EXAMPLE VII

*Procedure.*—Similar to that of Example II, except that all consolidations were prepared using fluids at 100° F.; 100 pore volumes of overflush solution was used, which consisted of 250 cc. of diesel oil spacer and 500 cc. of diesel oil containing 1 gram of trichloroacetic acid; consolidations were allowed to take place in an environment of 100° F.; and compressive strength measurements were made after an interval of six hours.

The composition of the plastic or consolidating fluid was 121:226:142:10 parts by weight, of Durez 21687 furfuryl alcohol resin, furfuryl alcohol, gamma aminopropylltriethoxy-silane, and water, respectively.

*Table VII*

| Test No. | 80° F. "In Air" Compressive Strength, p.s.i. | 80° F. "In Air" Compressive Strength, p.s.i., After— | |
|---|---|---|---|
| | | 6-Hr. Brine Boil | 6-Hr. H₂O Boil |
| 1 | 810 | | |
| 2 | | 795 | |
| 3 | | | 790 |

An example of a recommended minimum treatment of a well formation having a perforated interval of 5–5½ feet, with four shots per foot, and which can be performed in 2–3 hours is as follows:

EXAMPLE VIII (1) Preflush _____ 10 barrels of diesel oil and 2.5 gallons of Hyflo.
(2) Plastic solution or consolidating fluid _____ 157–163 gallons.
    Durez 21687 furfuryl alcohol resin _____ 1 drum (50–52 gallons).
    Furfuryl alcohol _____ 2 drums (100–104 gallons).
    Water _____ 5 gallons.
    Gamma aminopropyl-triethoxysilane _____ 3 quarts.
    Hyflo _____ 3 quarts.
(3) Spacer _____ 4 barrels of diesel oil.
(4) Catalyst solution _____ 28 barrels of diesel oil with 200 pounds of trichloroacetic acid dissolved therein.

In carrying out the method of the present invention, relatively slow pumping rates of 0.5–1 gallon per minute per perforation for the preflush and plastic solution will provide a more equalized distribution of these two throughout the entire interval being treated. Increased injection rates of 1.5–2.5 gallons per minute per perforation for the spacer and the catalyst will promote a desirable overflush sweeping action resulting in wide coverage of the plastic throughout the sand matrix.

In the preferred composition of the plastic or consolidating fluid, the furfuryl alcohol resin consolidates the sand; the furfuryl alcohol is a solvent and viscosity reducer for the resin and inhibits formation plugging; the silane greatly increases the strength of the consolidation; water acts as an ionization medium for the acid catalyst and speeds polymerization of the plastic; and, the surfactant reduces overall surface tension properties of the resinous mix, facilitating injection thereof, providing uniform distribution and high penetration, especially in "tight" sands. The surfactant also promotes stronger consolidations by imparting desired wetting properties to the plastic.

Although sand consolidation can be achieved without using all of the preferred constituents of the plastic as stated hereinabove, and with the omission of the preflush and spacer solution, optimum results are unlikely to be obtained. It should be understood, of course, that variations in both plastic formula and method steps may be made without departing from the scope of the invention.

Other resins, such as urea formaldehyde resins, may also be combined with the consolidating fluid of this invention for some applications thereof.

Although the present invention may be used with some degree of success in dirty sands, it is preferable that the formation and perforations to be treated be properly cleaned before the plastic or consolidating fluid is injected. The use of a surfactant such as Hyflo in the preflush solution, will assist in the removal of water blocks, break emulsion, sweep oil from the voids, render the sand surfaces preferentially water-wet, and tend to clean the perforations of mud occlusions. A properly conditioned formation enables the plastic to be injected in a more desirable and dependable manner into the well formation. Better cleaning of the formation, will result in improved resin wetting of the sand grains and stronger consolidations.

In preparing the consolidating fluid or plastic, it is preferred that the silane and resin be mixed together first and for a time sufficiently that the silane combines with the resin. Furfuryl alcohol, water, and surfactant are added next, in that order.

It is also recommended that the water not be added to the silane prior to blending of the silane with the resin, and further, that the consolidating fluid be used within 5–6 hours after water has been added. The plastic solution complete except for water, may be kept for several days prior to using if desired.

The present invention may be used to consolidate large grained sands, and successful consolidations have been achieved using other sands of 40–60 mesh and 20–40 mesh.

A number of field jobs have been successfully performed, using the method and consolidating fluid of the present invention.

One particular field job on a well in southeast Louisiana is set forth hereinbelow:

Well information:
    Perforated interval _____ 2682′–2686′.
    No. of perforations _____ 5.
    Fluid in hole _____ salt water.
    Casing _____ 2⅞″ tubing.
    Tubing _____ 1″.

Well history:

This was a newly completed well in a field known as a troublesome sand producer, and operator therefore determined to use a sand control measure from the beginning. After perforating, pressure was maintained on the formation to prevent sand from coming in the tubing. A plastic job for controlling the sand was previously performed by another company using a six-barrel resin or plastic treatment. After a suitable time, well was tested, and after trying to flow, went dead. On swabbing the well, sand broke in.

Well treatment:

(1) Approximately 12–15 cu. ft. of sand were cleaned out of the 1″ tubing.

(2) Well was cleaned out with salt water and the 1″ tubing was left in the hole.

(3) The salt water was displaced from the tubing and the annulus with diesel oil using a maximum pressure of 600 p.s.i.

(4) At 10:00 A.M. the well was preflushed with 4 gallons of Hyflo, a well-known surface active agent or surfactant, in 10 barrels of diesel oil at rate of ½ bbl./min. with a pressure in annulus of 350 p.s.i. and in tubing of 1100 p.s.i.

(5) At 11:37 A.M. the consolidating fluid was pumped into the formation at a rate of ½ bbl./min. with a pressure in annulus of 300 p.s.i. and in tubing of 1250 p.s.i. The consolidating fluid hit formation and pressure in tubing rose to 1350 p.s.i. At 11:47 A.M., 4 barrels of consolidating fluid had been placed in formation and pressure in annulus was 350 p.s.i.

The consolidating or treating fluid was prepared by mixing in sequence the following materials in a 14-barrel ribbon blender:

(a) 1 drum (50-52 gallons) of Durez 21687 furfuryl alcohol resin
(b) 3 quarts of gamma-aminopropyltriethoxysilane
(c) 2 drums of furfuryl alcohol
(d) 1 gallon Hyflo
(e) 5 gallons of fresh water (6) The consolidating fluid was followed with 1½ barrels of clean diesel oil spacer.

(7) At 12:38 P.M., 18 barrels of an afterflush of 200 pounds of trichloroacetic acid in 28 barrels of diesel oil were pumped into the formation. The displacement was finished at 12:44 P.M.

(8) Well closed in for 48 hours and then swabbed.

*Results.*—After swabbing, the well was flowing oil, sand free, with about 300 p.s.i., producing 65 barrels of fluid of approximately equal amounts of oil and salt water. With an allowable of only 28 barrels per day, the well was producing greater than its allowable. Two weeks later production was unchanged with still no trace of sand.

Six months later the well was still producing sand-free oil at substantially the same rate.

The disclosure in application Serial No. 260,825, which is also a continuation-in-part of application Serial No. 177,188, filed March 5, 1962, and the disclosure in application Serial No. 260,826, both of which are filed even date herewith is specifically included in this application.

Broadly, the present invention relates to a new and improved sand consolidation method and composition employing furfuryl alcohol resin and furfuryl alcohol, either singly or in combination with each other.

What is claimed is:

1. A method of permeably consolidating loose sands, comprising the steps of:
(a) introducing a non-catalyst bearing acid curable consolidating fluid into a formation to be consolidated selected from the group consisting of calcareous formations and non-calcareous formations, said consolidating fluid being selected from the group consisting of furfuryl alcohol resin, furfuryl alcohol and mixtures thereof; and,
(b) thereafter, introducing an oil overflush solution, having a relatively high degree of immiscibility with the consolidating fluid, into the formation, and said overflush solution containing a quantity of a catalyst dispersed therein for curing said consolidating fluid in the formation, thereby consolidating said loose sands into a hard permeable mass.

2. The method of claim 1, wherein a spacer of diesel oil and a surfactant is used between said consolidating fluid and said oil overflush solution.

3. The method of claim 1, wherein the formation is preflushed with a mixture of diesel oil and surfactant.

4. The method of claim 1, wherein said consolidating fluid contains a silane.

5. The method of claim 1, wherein said consolidating fluid contains a surfactant.

6. The method of claim 1, wherein said consolidating fluid contains a silane and water, and said silane is mixed with said resin prior to the addition of said water.

7. The method of claim 1, wherein said consolidating fluid contains a surfactant and water.

8. The method of claim 1, wherein said consolidating fluid contains a silane, a surfactant, and water, and said silane is mixed with said resin prior to the addition of said water and said surfactant.

9. The method of claim 1, wherein said consolidating fluid consists of furfuryl alcohol and a quantity of water.

10. A method of permeably consolidating loose sands, comprising the step of:

(1) introducing into a formation selected from the group consisting of calcareous formations and non-calcareous formations, a quantity of diesel oil with a relatively small amount of a surfactant dispersed therein;
(2) introducing into the formation, a quantity of a non-catalyst bearing acid curable furfuryl alcohol resin consolidating fluid;
(3) introducing into the formation, a diesel oil spacer; and,
(4) introducing into the formation, an oil overflush solution having a relatively high degree of immiscibility with the consolidating fluid, and said overflush solution containing a quantity of a catalyst dispersed therein for curing said consolidating fluid in the formation, thereby consolidating said loose sands into a hard permeable mass.

11. The method of claim 10, wherein the consolidating fluid has the following formula, based on 100 parts by weight of furfuryl alcohol resin:

| | Parts |
|---|---|
| Furfuryl alcohol resin | 100 |
| Furfuryl alcohol | 0–1000 |
| Silane | 0–50 |
| Surfactant | 0–100 |
| Water | 0–100 | with the amount of said water being dependent upon the amount of furfuryl alcohol in the fluid.

12. The method of claim 10, wherein the consolidating fluid has the following formula, based on 100 parts by weight of furfuryl alcohol resin:

| | Parts |
|---|---|
| Furfuryl alcohol resin | 100 |
| Furfuryl alcohol | 100–250 |
| Silane | 0.1–10 |
| Surfactant | 0.5–10 |
| Water | 5–15 |

13. The method of claim 10, wherein the consolidating fluid has the following formula in parts by weight:

| | |
|---|---|
| Furfuryl alcohol resin | about 121 |
| Furfuryl alcohol | about 226 |
| Gamma aminopropyltriethoxysilane | about 1.42 |
| Surfactant | about 1.43 |
| Water | about 10 |

14. The method of claim 10, wherein the oil overflush solution comprises from about 0.1 to about 3 parts by weight of trichloroacetic acid and 82 parts by weight of diesel oil.

15. A consolidating fluid for consolidating loose and incompetent sands, adapted to be acid cured, having the formula based on parts by weight, as follows:

| | Parts |
|---|---|
| Furfuryl alcohol resin | 100 |
| Furfuryl alcohol | 100–250 |
| Silane | 0.1–10 |
| Surfactant | 0.5–10 |
| Water | 5–15 |

16. A consolidating fluid for consolidating loose and incompetent sands, adapted to be acid cured, having the formula based on parts by weight, as follows:

| | |
|---|---|
| Furfuryl alcohol resin | about 121 |
| Furfuryl alcohol | about 226 |
| Gamma aminopropyltriethoxysilane | about 1.42 |
| Surfactant | about 1.43 |
| Water | about 10 |

17. A method of permeably consolidating loose or incompetent earth formations without regard to the calcareous content of said formations, comprising the steps of:

(a) introducing into the formation to be consolidated, a non-catalyst bearing acid curable consolidating fluid selected from the group consisting of furfuryl alcohol resin, furfuryl alcohol and mixtures thereof; and, (b) thereafter, introducing into the formation a diesel oil overflush solution containing a quantity of a catalysyt dissolved therein for curing said consolidating fluid in the formation, thereby consolidating the formation into a hard permeable mass.

18. A method of permeably consolidating loose or incompetent earth formations without regard to the calcareous content of said formations, comprising the steps of:

(a) introducing into the formation to be consolidated, a non-catalyst bearing acid curable consolidating fluid comprising furfuryl alcohol resin, furfuryl alcohol, a silane and water; and, (b) thereafter, introducing into the formation a diesel oil overflush solution containing a quantity of a catalyst dissolved therein for curing said consolidating fluid in the formation, thereby consolidating the formation into a hard permeable mass.

19. A method of permeably consolidating loose or incompetent earth formations without regard to the calcareous content of said formations, comprising the steps of:

(a) introducing into the formation to be consolidated, a quantity of diesel oil containing a relatively small quantity of a surfactant dispersed therein;

(b) introducing into the formation to be consolidated, a quantity of a non-catalyst bearing acid curable furfuryl alcohol resin consolidating fluid;

(c) introducing into the formation to be consolidated, a diesel oil spacer; and (d) introducing into the formation to be consolidated, a diesel oil overflush solution containing a quantity of catalyst dissolved therein for curing said consolidating fluid in situ, thereby consolidating the formation treated into a hard permeable mass.

References Cited by the Examiner

UNITED STATES PATENTS

| | | | |
|---|---|---|---|
| 2,001,350 | 5/35 | Mills | 166—38 |
| 2,378,817 | 6/45 | Wrightsman et al. | 166—33 |
| 2,796,934 | 6/57 | Vogel | 166—33 |
| 3,052,583 | 9/62 | Carlstrom et al. | 260—38 X |
| 3,100,527 | 8/63 | Hilton et al. | 166—33 |
| 3,115,930 | 12/63 | Bernard | 166—33 |
| 3,123,137 | 3/64 | Young et al. | 166—33 |

OTHER REFERENCES

Hower, W. F.: Large-Scale Laboratory Investigation of Sand Consolidation Techniques, in Journal of Petroleum Technology, pp. 1221–1229, December, 1961, TN 860J6.

Spain, H. H.: New Plastic Checks Sand Production, in The Oil and Gas Journal, p. 112–115, April 16, 1962, TN 860J6.

CHARLES E. O'CONNELL, *Primary Examiner.*

BENJAMIN HERSH, *Examiner.*

UNITED STATES PATENT OFFICE
CERTIFICATE OF CORRECTION

Patent No. 3,199,590

August 10, 1965

Bill M. Young

It is hereby certified that error appears in the above numbered patent requiring correction and that the said Letters Patent should read as corrected below.

Column 2, line 71, for "of" read -- or --; column 3, line 51, after "at" insert -- least --.

Signed and sealed this 14th day of June 1966.

(SEAL)
Attest:

ERNEST W. SWIDER
Attesting Officer

EDWARD J. BRENNER
Commissioner of Patents